(12) United States Patent
Moon (10) Patent No.: US 11,253,945 B2
(45) Date of Patent: Feb. 22, 2022

(54) METHOD FOR JOINING HOT-STAMPED STEEL SHEETS

(71) Applicants: Hyundai Motor Company, Seoul (KR); Kia Motors Corporation, Seoul (KR)

(72) Inventor: Jung-Myung Moon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 673 days.

(21) Appl. No.: 16/192,362

(22) Filed: Nov. 15, 2018

(65) Prior Publication Data

US 2019/0176261 A1 Jun. 13, 2019

(30) Foreign Application Priority Data

Dec. 7, 2017 (KR) .................. 10-2017-0167641

(51) Int. Cl.
| | | |
|---|---|---|
| *B23K 11/11* | (2006.01) | |
| *B21D 22/02* | (2006.01) | |
| *B23K 11/00* | (2006.01) | |
| *B23K 11/34* | (2006.01) | |
| *B21D 22/20* | (2006.01) | |

(52) U.S. Cl.
CPC ......... *B23K 11/115* (2013.01); *B21D 22/022* (2013.01); *B23K 11/0026* (2013.01); *B23K 11/34* (2013.01); *B21D 22/20* (2013.01)

(58) Field of Classification Search
None
See application file for complete search history.

(56) References Cited

U.S. PATENT DOCUMENTS

| 4,427,869 | A | * | 1/1984 | Kimura | .................. | B23K 11/14 |
|---|---|---|---|---|---|---|
| | | | | | | 219/86.9 |
| 4,495,397 | A | * | 1/1985 | Opprecht | ............... | B23K 11/14 |
| | | | | | | 219/86.1 |
| 5,783,794 | A | * | 7/1998 | Oikawa | ................. | B23K 11/115 |
| | | | | | | 219/118 |
| 6,281,466 | B1 | * | 8/2001 | VanOtteren | .......... | B23K 11/185 |
| | | | | | | 219/118 |
| 8,555,691 | B2 | | 10/2013 | Kurisu et al. | | |
| 2005/0152741 | A1 | * | 7/2005 | Fujimoto | ............... | B23K 26/22 |
| | | | | | | 403/270 |

(Continued)

FOREIGN PATENT DOCUMENTS

| CN | 1863614 A | 11/2006 |
|---|---|---|
| CN | 104023946 A | 9/2014 |

(Continued)

*Primary Examiner* — Ibrahime A Abraham
*Assistant Examiner* — Gyounghyun Bae
(74) *Attorney, Agent, or Firm* — Mintz Levin Cohn Ferris Glovsky and Popeo, P.C.; Peter F. Corless (57) ABSTRACT

A method for manufacturing a hot-stamped steel sheet is provided. The method includes forming a welding portion of one steel sheet of a plurality of steel sheets to be joined. The welding portion has a thickness that is greater than that of a non-welding portion. The method also includes aligning welding portions of the plurality of steel sheets with each other, and joining the plurality of steel sheets by spot welding between the welding portions.

3 Claims, 6 Drawing Sheets

(56) References Cited

U.S. PATENT DOCUMENTS

| | | | |
|---|---|---|---|
| 2008/0241572 A1* | 10/2008 | Miyamoto | B23K 11/20 428/600 |
| 2009/0294410 A1* | 12/2009 | Iwase | B21J 15/08 219/91.23 |
| 2015/0013898 A1 | 1/2015 | Kato | |
| 2015/0231730 A1 | 8/2015 | Yang et al. | |
| 2016/0144451 A1* | 5/2016 | Fujimoto | B23K 11/115 219/92 |
| 2018/0073532 A1* | 3/2018 | Whalen | F16B 17/008 |

FOREIGN PATENT DOCUMENTS

| | | |
|---|---|---|
| CN | 104842059 A | 8/2015 |
| JP | 62156079 A * | 7/1987 |
| JP | 3649593 * | 5/2005 |
| JP | 3649593 B2 * | 5/2005 |
| JP | 2011230129 A | 11/2011 |
| JP | 2012-206148 A | 10/2012 |
| KR | 10-1246909 B1 | 3/2013 |
| KR | 10-1638348 B1 | 7/2016 |
| KR | 10-1640358 B1 | 7/2016 |

\* cited by examiner

METHOD FOR JOINING HOT-STAMPED STEEL SHEETS

CROSS-REFERENCE TO RELATED APPLICATIONS

This application claims priority to Korean Patent Application No. 10-2017-0167641, filed on Dec. 7, 2017, which is incorporated herein by reference in its entirety.

BACKGROUND

Field of the Disclosure

The present disclosure relates to a method for joining steel sheets, and more particularly to a method for joining steel sheets which are manufactured by a hot stamping process, by welding.

Description of Related Art

Figure 1:
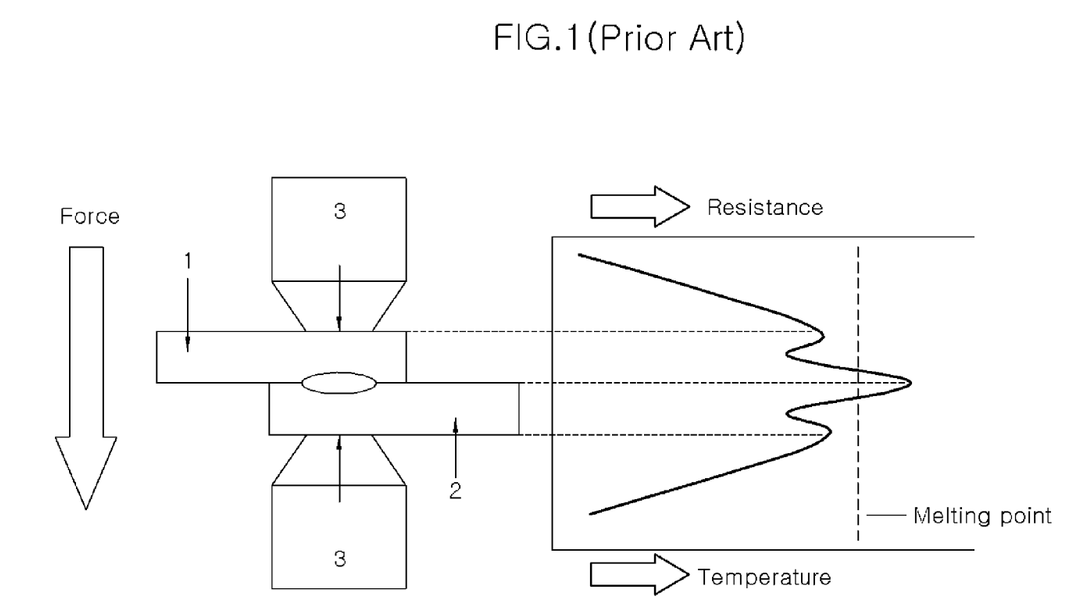
FIG. 1 illustrates a spot welding method for steel sheets in the related art.

Spot welding is a common method for joining steel sheets, which is generally used for manufacturing parts of a vehicle body. In the spot welding method, as shown in FIG. 1 of the related art, cylindrical electrodes 3 are brought into contact with overlapping portions of two or more steel sheets 1 and 2 to apply a local welding force. Subsequently, a current is applied to generate resistance heat to melt and solidify joining surfaces of the steel sheets.

The main factors that affect the welding quality and strength include the welding force of the electrode tip, the current, the time for which the current is applied, etc., when the spot welding is performed. It is necessary to secure appropriate welding conditions that depend on a thickness, strength, and an existence of plating layer of the steel sheets to be joined.

Figure 2:
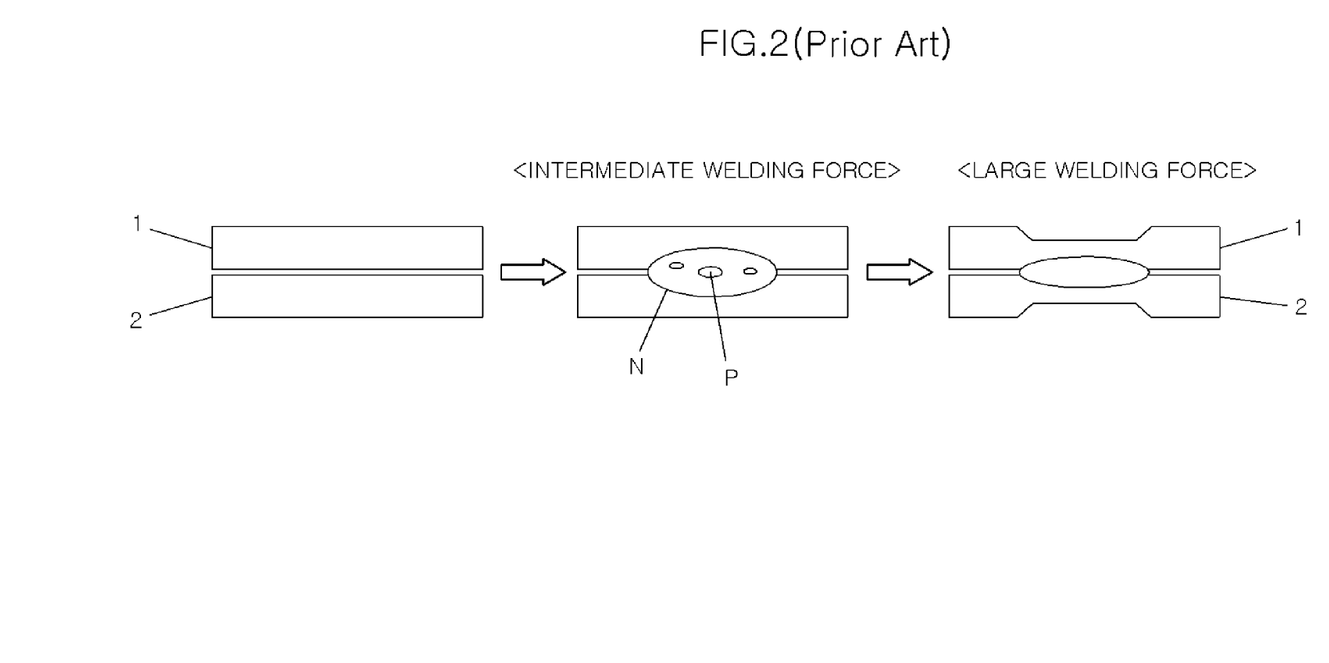
FIG. 2 illustrates a problem generated when the steel sheets are joined according to the method illustrated in FIG. 1 in the related art.

However, when the spot welding is performed, as shown in FIG. 2 of the related art, pores P are generated in a welding nugget N during the process of expansion and contraction of a melted portion, and joining strength is decreased as the size of the pore P is increased. When the welding force is increased to suppress a generation of the pores, an indentation is increased along with the suppression of the pores P, and the joining strength is also decreased due to a reduction in thickness caused by the indentation. Accordingly, an increase of the welding force is also limited.

The contents described in this section are to help the understanding of the background of the present disclosure, and may include what is not previously known to those skilled in the art to which the present disclosure pertains

SUMMARY

The present disclosure provides a method of joining hot stamped steel sheets, which is capable of minimizing an indentation even when a welding force is increased, to maintain joining strength between the hot stamped steel sheets.

A method for manufacturing a hot-stamped steel sheet according to an aspect of the present disclosure may include forming a welding portion of one steel sheet of a plurality of steel sheets to be joined, to have a thickness greater than a thickness of a non-welding portion; aligning welding portions of the plurality of steel sheets with each other; and joining the steel sheets by spot welding between the welding portions.

In addition, joining the steel sheets by the spot welding may include stacking the plurality of steel sheets to be joined, to allow the welding portion having the thickness greater than the thickness of the non-welding portion to protrude outward and welding the welding portions of the plurality of steel sheets.

In particular, forming the welding portion to have the thickness greater than the thickness of the non-welding portion may be performed by a coining performed by a press apparatus. Further, a contact surface of the press apparatus that corresponds to the welding portion of the one steel sheet may have a concave bead formed thereon and obtained by excavating in the contact surface inward, whereby a heel tap is generated on the concave bead when the coining is performed, to increase the thickness of the welding portion of the one steel sheet. The coining may include a hot stamping process, and the thickness of the welding portion of the one steel sheet may be greater than the thickness of the non-welding portion of the one steel sheet by 10% or less.

BRIEF DESCRIPTION OF THE DRAWINGS

A brief description of each drawing is provided to more sufficiently understand drawings used in the detailed description of the present disclosure.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

To fully understand the present disclosure, operational advantages of the present disclosure, objects achieved by exemplary embodiments of the present disclosure, reference should be made to the accompanying drawings and contents illustrated in the accompanying drawings which illustrate the preferred embodiments of the present disclosure. In describing the exemplary embodiments of the present disclosure, well-known techniques or repetitive descriptions that may unnecessarily obscure the gist of the present disclosure will be reduced or omitted.

Figure 3:
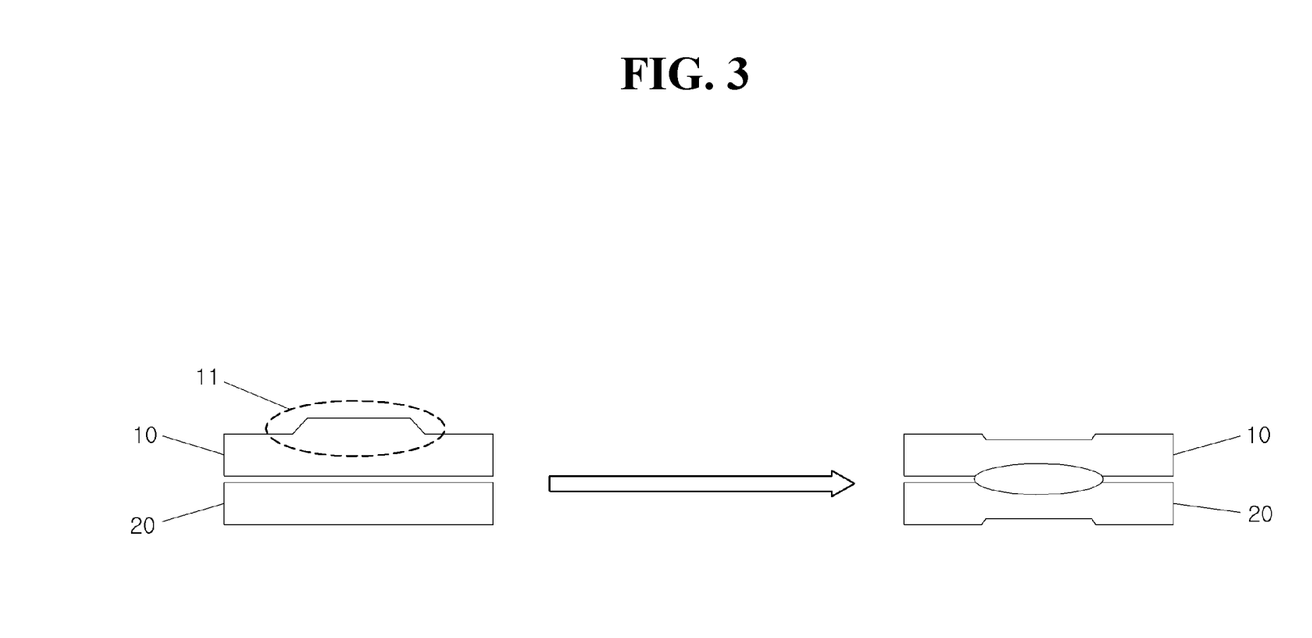
FIG. 3 conceptually illustrates a method for joining hot-stamped steel sheets according to an exemplary embodiment of the present disclosure.

FIG. 3 conceptually illustrates a method for joining hot-stamped steel sheets according to the present disclosure. A method for joining hot stamped steel sheets according to an exemplary embodiment of the present disclosure may include locally increasing a thickness of a welding portion 11 of one hot stamped steel sheet 10 of two or more hot stamped steel sheets 10, 20 to be joined, and performing spot welding for the welding portion 11 having an increased thickness, whereby, unlike the related art shown in FIG. 2 where the welding force is increased, pores and an indentation may be minimized, and thus joining strength between the steel sheets may be strongly maintained.

Figure 4:
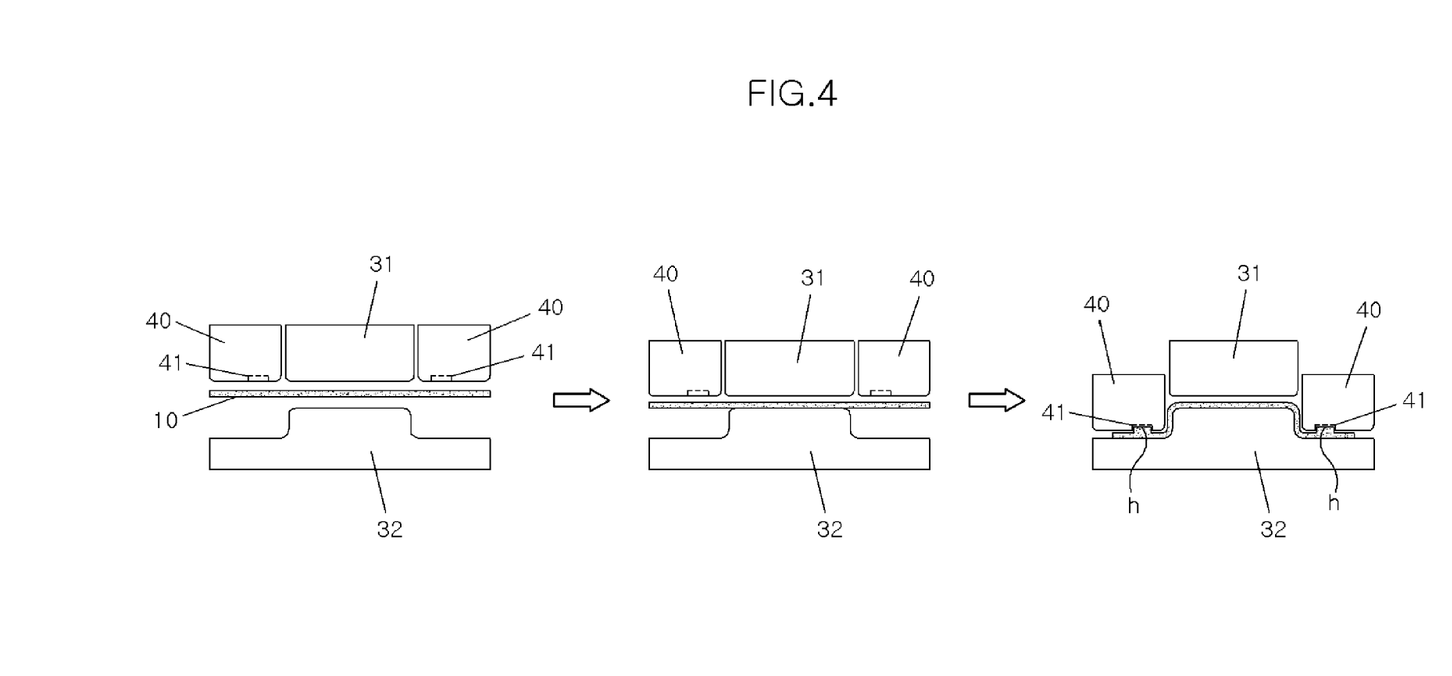
FIG. 4 illustrates an exemplary process of the method for joining hot-stamped steel sheets according to an exemplary embodiment of the present disclosure.
Figure 5:
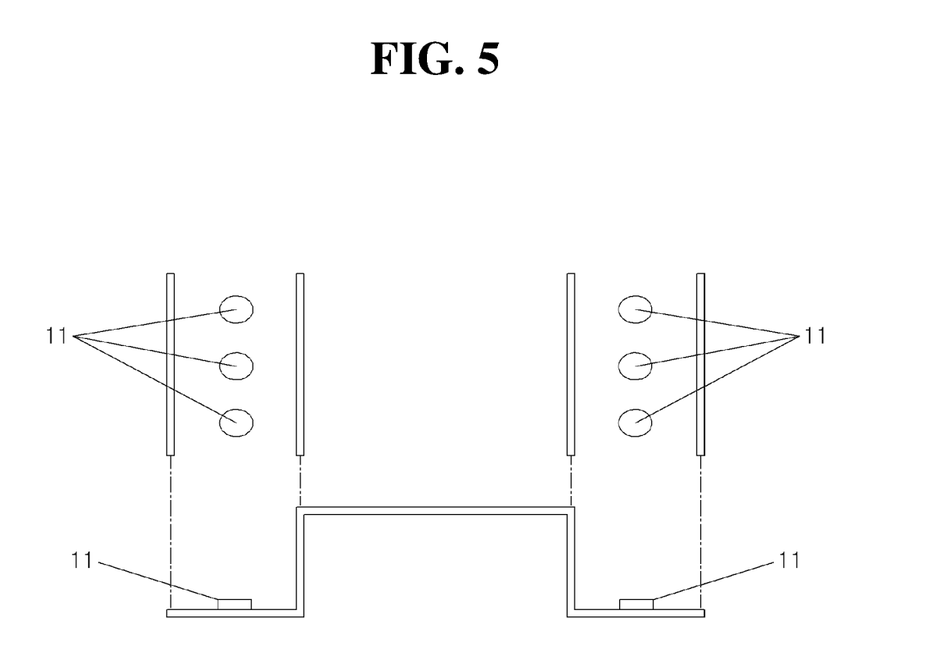
FIG. 5 illustrates a welding portion of the hot-stamped steel sheets joined by the method according to an exemplary embodiment of the present disclosure shown in FIG. 4.
Figure 6:
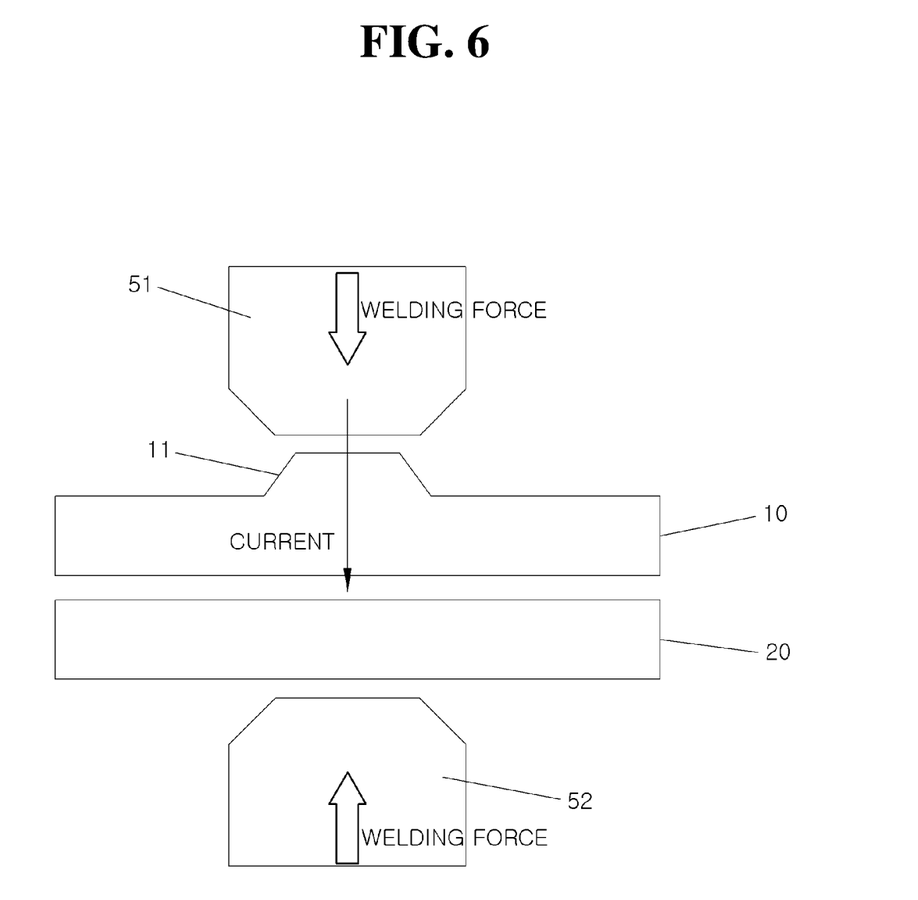
FIG. 6 illustrates an exemplary process of the method for joining the hot-stamped steel sheets according to an exemplary embodiment of the present disclosure.

FIG. 4 illustrates an exemplary process of the method for joining the hot-stamped steel sheets according to the present disclosure, FIG. 5 illustrates a welding portion of the hot-stamped steel sheets joined by the method according to the present disclosure, and FIG. 6 illustrates an exemplary process of the method for joining the hot-stamped steel sheets according to the present disclosure. Hereinafter, the method for joining the hot stamped steel sheets according to an exemplary embodiment of the present disclosure is described in more detail with reference to FIGS. 4 to 6.

First, a steel sheet may be heated to a predetermined temperature and may be subsequently subjected to a hot stamping process to prepare a hot-stamped steel sheet 10. Particularly, the hot stamping predetermined temperature may first be a temperature for obtaining full martensite, for example, about 870° C. or greater, and more preferably, about 930° C. It is difficult to locally increase a thickness of the steel sheet through a coining in a conventional press process for a cold-rolled steel sheet. Instead, in the press process for the hot stamped steel sheet, a strength of steel sheet which is in a heated state before contacting a mold may be low and pourability of raw material may be maintained. Therefore, a thickness of the steel sheet may be locally increased by changing a shape of the mold.

The hot stamped steel sheet 10 may be inserted between an upper mold 31 and a lower metal mold 32 and may be placed thereon. Subsequently, a blank holder 40 of a press apparatus may press and bend the hot stamped steel sheet 10 to allow the steel sheet to be formed into a desired shape.

The blank holder 40 of the press apparatus for performing the method for joining the hot stamped steel sheets according to the present disclosure may include a concave bead 41 formed on a contact surface thereof that corresponds to the welding portion 11 of the hot stamped steel sheet 10, and the concave bead 41 may be formed by excavating in the blank holder inward. Thus, when the blank holder 40 presses the hot stamped steel sheet 10, a heel tap h may be generated on the concave bead 41 due to a coining of the blank holder 40 at a press bottom center to locally increase a thickness of the welding point of the hot stamped steel sheet 10. As shown in FIG. 5, a plurality of welding portions 11 that require welding may be formed by a plurality of concave beads 41, and each of the concave beads 41 may have a circular planar cross-section for spot welding.

Subsequently, as shown in FIG. 6, the welding portion of the hot stamped steel sheet 10 in which the welding portion 11 has the locally increased thickness as described above may be aligned with a welding portion of the hot stamped steel sheet 20 to be welded to the above steel sheet, electrode tips 51 and 52 may be brought to abut the steel sheets to correspond to the welding portions of two steel sheets and press two hot stamped steel sheets 10 and 20. Subsequently, the welding portions may be melted by applying electric power and then may be solidified to join two steel sheets together.

The amount of increase in the thickness of the welding portion may be about 10% of the initial thickness or less. In the related art, when a thickness of a conventional hot stamped steel sheet is 1.0 mm to 2.0 mm, an allowable depth of the indentation is about 0.1 mm. Therefore, the thickness of the welding portion may be increased to the thickness which is suitable for satisfying a depth of the indentation and compensating for the excessive indentation. The amount of increase in the thickness of welding portion that satisfies this requirement may be about 10% or less. In addition, when the thickness of the welding portion exceeds 10%, a part of the welding portion may remain after the welding, and a surface of the steel sheet may not be flat, which may require additional processing.

By welding the hot stamped steel sheets using the above described method, the welding force may be increased, as compared with a method in the related art. Furthermore, the number of pores inside a nugget may be reduced since the welding force may be increased, the thickness of the steel sheet may be reduced, and the indentation on the steel sheet may be minimized, to secure joining strength between the steel sheets.

According to the method for joining the hot stamped steel sheets of the present disclosure, occurrence of the pores in the welding nugget may be suppressed and the indentation may be minimized by locally increasing a thickness of the welding portion of the steel sheet and welding the welding portion having an increased thickness. As a result, even when the welding force is increased, the welding strength between the steel sheets may be secured.

Although the above-described present disclosure has been described with reference to the illustrated drawings, it will be apparent to those skilled in the art that various changes and modifications may be made without departing from the scope of the present disclosure. Accordingly, such modifications or changes should be considered as being covered by the claims of the present disclosure, and the scope of the present disclosure should be construed on the basis of the appended claims.

What is claimed is:

1. A method for manufacturing a hot-stamped steel sheet, comprising:
  forming a welding portion on one steel sheet of a plurality of steel sheets to be joined, wherein the welding portion of the one steel sheet has a thickness greater than a thickness of a non-welding portion of the one steel sheet;
  aligning welding portions of the plurality of steel sheets with each other; and
  joining the plurality of steel sheets by spot welding between the welding portions of the plurality of steel sheets,
  wherein joining the plurality of steel sheets by the spot welding includes:

stacking the plurality of steel sheets to be joined to allow the welding portion of the one steel sheet to protrude toward a press apparatus; and welding the welding portions of the plurality of steel sheets, wherein the welding portion of the one steel sheet is formed by a coining that is performed by the press apparatus, and wherein a contact surface of the press apparatus includes a concave bead that corresponds to the welding portion of the one steel sheet, such that when the coining is performed, a heel tap is generated to increase the thickness of the welding portion of the one steel sheet.

2. The method for manufacturing the hot stamped steel sheet of claim 1, wherein the coining includes a hot stamping process.

3. The method of manufacturing the hot-stamped steel sheet of claim 1, wherein the thickness of the welding portion of the one steel sheet is greater than the thickness of the non-welding portion of the one steel sheet by greater than 0% but less than 10%.

\* \* \* \* \*